Nov. 4, 1947.     G. E. HUSTED     2,430,176
CONNECTING ROD
Filed Aug. 4, 1945
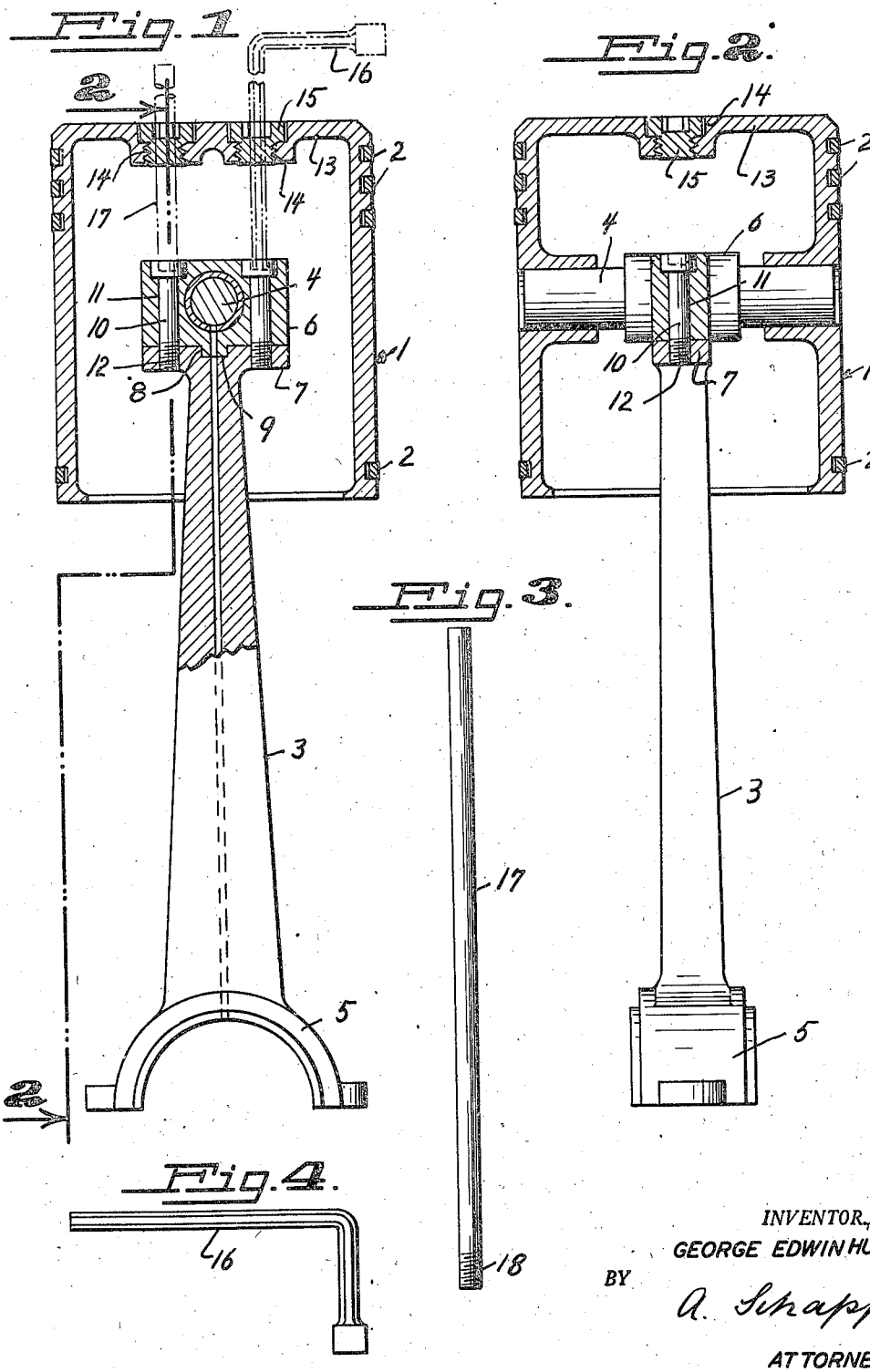
INVENTOR,
GEORGE EDWIN HUSTED
BY
A. Schapp
ATTORNEY.

Patented Nov. 4, 1947

2,430,176

UNITED STATES PATENT OFFICE 2,430,176

CONNECTING ROD

George Edwin Husted, San Francisco, Calif.

Application August 4, 1945, Serial No. 608,961

9 Claims. (Cl. 309—19)

The present invention relates to improvements in connecting rods, and its principal object is to provide a connecting rod in which the wrist pin bearing is removably secured upon the shank of the connecting rod so as to allow the bearing to be separated from the rod when it is desired to withdraw the piston for the purpose of renewing the piston rings.

It is further proposed to provide a piston assembly in which the piston, the wrist pin, and the wrist pin bearing are formed in one unit adapted to be secured upon, and to be removed from, the shank of the connecting rod.

It is still further proposed to provide means for securing the wrist pin bearing upon the end of the shank of the connecting rod in such a manner that the securing means may be readily applied or removed while the different parts are arranged in assembled relation.

Further objects and advantages of my invention will be disclosed as the specification proceeds, and the novel features thereof will be fully defined in the claims attached hereto.

The preferred form of my invention is illustrated in the accompanying drawing, forming part of this application, in which:

Figure 1 shows a vertical section through my piston arrangement; and the upper end of the connecting rod;

Figure 2, a vertical section taken along line 2—2 of Figure 1;

Figure 3, an elevation of a tool adapted to be used for bringing the parts in alined relation; and Figure 4, a side elevation of a suitable tool adapted for manipulating the securing means.

While I have shown only the preferred form of my invention, I wish to have it understood that various changes or modifications may be made within the scope of the claims hereto attached, without departing from the spirit of the invention.

Referring to the drawing in detail, I have shown a piston 1, which may be of conventional construction, except for distinguishing features particularly pointed out hereinafter, and which may be considered part of an internal combustion engine or of any other device in which pistons of this type are employed.

It will be appreciated that the piston is intended for reciprocating motion in a cylindrical chamber, and that a cylinder head is conventionally secured upon the upper end of the chamber.

The piston is provided with a plurality of piston rings 2, and occasionally it becomes necessary to remove the piston from the chamber for inspection and renewal of the piston rings, or for other repair purposes.

The piston is conventionally connected to a connecting rod 3 by means of a wrist pin 4, the lower end of the connecting rod terminating in a bearing 5 adapted for engagement over a crank pin, not shown in the drawing.

The principal feature of the present invention is that the bearing 6 for the wrist pin 4 is made in one unit and is removable from the shank of the connecting rod at a point underneath the bearing, which allows the piston, the wrist pin and the wrist pin bearing to be withdrawn from the cylinder of the engine as a unit.

For the purposes of my invention the upper end of the connecting rod is made to terminate in a flange 7 adapted to have the wrist pin bearing 6 seated thereon. The wrist pin bearing may be centered with respect to the flange by means of a central cylindrical stud 8 fitting into a corresponding cylindrical cavity 9 in the end of the flange.

For securing the wrist pin bearing upon the flange 7, I use, in the preferred form, a pair of cap screws 10 arranged on opposite sides of the wrist pin 4. These cap screws pass through holes 11 in the wrist pin bearing, and are threaded into the flange, as at 12.

The cap screws are preferably dimensioned to come flush with the top of the bearing and the bottom of the flange, as illustrated in the drawing.

To give access to the cap screws for insertion or removal thereof, the end wall 13 of the piston is provided with a pair of holes 14 arranged in alinement with the cap screws and are adapted to be closed by means of plugs 15 threaded into the holes.

The operation of my invention is as follows:

If it is desired to remove the piston from the piston chamber, after the cylinder head has been removed, the two plugs 15 are first taken out to give access to the two cap screws 10.

A suitable wrench, such as the conventional Allen wrench 16, illustrated in Figure 4, may then be introduced through the holes 14 for turning and removing the cap screws. The fit between the Allen wrench and the cap screws is preferably such that the cap screws may be lifted out by means of the wrench.

After the cap screws have been removed, the piston, wrist pin, and wrist pin bearing may be separated from the connecting rod and lifted out as a unit for effecting the necessary repairs.

When the piston is to be reinserted, it will usually be found that the upper end of the connecting rod 3 rests against the wall of the cylinder chamber, with the connecting rod in inclined position.

For centering the connecting rod, the mechanic may use the tool 17, illustrated in Figure 3, which merely consists of a rod of considerable length having a lower threaded end, as at 18. The operator engages the lower end 18 of the rod into one of the screw holes 12 in the flange of the connecting rod, and by suitable pressure is able to move the connecting rod into vertical position, whereupon he may screw the rod 17 into the hole in the connecting rod flange, the thread 18 being the same as the thread on the cap screw.

Next, the operator lifts the piston assembly into proper position above the piston chamber to bring one of the holes 11 in the wrist pin bearing over the rod 17. Now he lowers the piston assembly so as to cause the rod to pass through the hole 11 and the corresponding hole 14 in the upper end of the piston.

When the piston reaches the cylinder block, it is worked into the chamber in a conventional manner, the rod 17 serving to automatically line up the holes 11 and 12, which again bring the centering stud 8 automatically opposite the corresponding cavity 9.

With the parts thus arranged in assembled relation, one of the cap screws may be readily applied through the screw holes 11 and 12. After this cap screw has been screwed home, the rod 17 is removed, and the second cap screw may then readily be substituted for the same.

Insertion of the two plugs 15 completes the operation.

I claim:

1. In a piston assembly, a connecting rod shank having a flange at one end thereof, a piston having a wrist pin and a complete one-piece bearing on said pin, the bearing having a bottom face shaped for seating on the flange, and cap screws extending through the bearing into the flange for removably securing the bearing upon the flange.

2. In a piston assembly, a connecting rod shank having a flange at one end thereof, a piston having a wrist pin and a complete one-piece bearing on said pin, the bearing having a bottom face shaped for seating on the flange, and cap screws extending through the bearing into the flange for removably securing the bearing upon the flange, the piston having holes in the end thereof to give access to the cap screws.

3. A connecting rod comprising a shank having a transverse flange at one end thereof, a complete wrist pin bearing made to form a separate self-sustaining unit, and means for rigidly and removably securing the bearing upon the flange.

4. A connecting rod comprising a shank having a transverse flange at one end thereof, a complete wrist pin bearing made to form a separate unit, and means for rigidly and removably securing the bearing upon the flange, the said means comprising cap screws passing through the bearing on opposite sides of the bore thereof and threaded into the flange.

5. A connecting rod comprising a shank having a transverse flange at one end thereof and having a centering cavity in said flange, a complete wrist pin bearing made to form a separate unit and having a seat fitting upon the flange, with a centering pin for the cavity, and means for rigidly and removably securing the bearing upon the pin.

6. In a piston assembly, a connecting rod shank, a piston having a transverse wrist pin supported therein, a complete bearing on said pin and made to form a self-sustaining unit, and means for removably securing the bearing upon the end of the connecting rod.

7. In a piston assembly, a connecting rod shank, a piston having a transverse wrist pin supported therein, a complete self-sustained bearing on said pin, and means for removably securing the bearing upon the end of the connecting rod, the piston having holes in the end thereof to give access to the securing means.

8. In a piston assembly, a connecting rod shank having a flange at one end thereof, a piston having a wrist pin supported transversely therein, a complete bearing on said wrist pin and made to form a self-sustained unit, the bearing having a bottom face shaped for seating on the flange, and cap screws extending through the bearing into the flange for removably securing the bearing upon the flange.

9. In a piston assembly, a connecting rod shank having a flange at one end thereof, a piston having a wrist pin supported transversely therein, a complete self-sustained bearing on said wrist pin, the bearing having a bottom face shaped for seating on the flange, and cap screws extending through the bearing into the flange for removably securing the bearing upon the flange, the piston having holes in the end thereof to give access to the cap screws.

GEORGE EDWIN HUSTED.

REFERENCES CITED

The following references are of record in the file of this patent:

UNITED STATES PATENTS

| Number | Name | Date |
| --- | --- | --- |
| 727,937 | Haase | May 12, 1903 |
| 1,320,428 | Stancliff | Nov. 4, 1919 |
| 2,038,404 | Atwood | Apr. 21, 1936 |
| 1,718,963 | Knudsen | July 2, 1929 |

FOREIGN PATENTS

| Number | Country | Date |
| --- | --- | --- |
| 276,458 | England | Sept. 1, 1927 |